United States Patent
Kim et al.

(10) Patent No.: US 10,082,297 B2
(45) Date of Patent: Sep. 25, 2018

(54) OVEN AND METHOD FOR CONTROLLING THE SAME

(71) Applicant: SAMSUNG ELECTRONICS CO., LTD., Suwon-si (KR)

(72) Inventors: Seung-Hwan Kim, Suwon-si (KR); Dong Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/661,463

(22) Filed: Mar. 18, 2015

(65) Prior Publication Data

US 2015/0292749 A1 Oct. 15, 2015

(30) Foreign Application Priority Data

Apr. 14, 2014 (KR) .................. 10-2014-0044306

(51) Int. Cl.
| | |
|---|---|
| *F24C 7/08* | (2006.01) |
| *A23L 1/01* | (2006.01) |
| *A23L 5/10* | (2016.01) |

(52) U.S. Cl.
CPC ............. *F24C 7/087* (2013.01); *A23L 5/10* (2016.08); *F24C 7/081* (2013.01); *F24C 7/085* (2013.01); *A23V 2002/00* (2013.01)

(58) Field of Classification Search
CPC .... A23L 5/10; F24C 7/08; F24C 7/085; F24C 7/081; F24C 7/087; A23V 2002/00
USPC .................................... 99/332, 335; 219/412
See application file for complete search history.

(56) References Cited

U.S. PATENT DOCUMENTS

| | | | | |
|---|---|---|---|---|
| 3,699,307 A | * | 10/1972 | Malkin ............... | H05B 1/0225 219/412 |
| 3,819,906 A | * | 6/1974 | Gould, Jr. ............... | F24C 7/087 219/498 |
| 3,886,539 A | * | 5/1975 | Gould, Jr. ............... | F24C 7/087 219/445.1 |

(Continued)

FOREIGN PATENT DOCUMENTS

| | | |
|---|---|---|
| AU | 2004255018 A1 | 3/2005 |
| EP | 0 275 990 A2 | 7/1988 |

OTHER PUBLICATIONS

Extended European Search Report dated Sep. 10, 2015 in corresponding European Patent Application No. 15163408.6.

(Continued)

*Primary Examiner* — Eric Stapleton
(74) *Attorney, Agent, or Firm* — Staas & Halsey LLP

(57) ABSTRACT

An oven including a heater arranged in a cooking compartment, a temperature sensor to sense a temperature of the cooking compartment for a plurality of preset periods of time, and a controller to reset on/offtimes of the heater for at least one of the plurality of preset periods based on a preset target temperature and a current temperature and a previous temperature of the cooking compartment, sensed by the temperature sensor, and to control a driving of the heater according to the reset on/off times. By controlling the on/off times of the heater, a ripple phenomenon which occurs because the target temperature does not remain the same may be decreased. Thus, temperature differences may be reduced during cooking of food and, accordingly, cooking ability may be enhanced.

16 Claims, 15 Drawing Sheets

(56) References Cited

U.S. PATENT DOCUMENTS

| | | | |
|---|---|---|---|
| 3,974,472 A * | 8/1976 | Gould, Jr. | F24C 7/087 219/506 |
| 4,054,778 A * | 10/1977 | Wollich | F24C 7/087 219/413 |
| 4,217,482 A * | 8/1980 | Wadia | A47J 27/62 219/435 |
| 4,230,731 A * | 10/1980 | Tyler | G01K 1/024 219/713 |
| 4,234,783 A * | 11/1980 | Aoshima | A47J 27/004 219/432 |
| 4,320,285 A * | 3/1982 | Koether | A47J 37/1266 219/441 |
| 4,345,145 A * | 8/1982 | Norwood | A47J 37/0623 219/408 |
| 4,431,906 A * | 2/1984 | Oota | A47J 27/62 219/435 |
| 4,443,690 A * | 4/1984 | Payne | F24C 15/106 219/442 |
| 4,454,803 A * | 6/1984 | Wolf | A47J 37/0842 99/329 RT |
| 4,467,184 A * | 8/1984 | Loessel | G05D 23/1917 219/492 |
| 4,484,065 A * | 11/1984 | Ueda | F24C 7/08 219/492 |
| 4,492,336 A * | 1/1985 | Takata | A47J 27/62 126/39 G |
| 4,510,376 A * | 4/1985 | Schneider | A47J 37/0842 219/490 |
| 4,553,011 A * | 11/1985 | Nakata | H05B 6/6411 219/710 |
| 4,554,437 A * | 11/1985 | Wagner | A21B 1/48 219/388 |
| 4,604,518 A * | 8/1986 | Payne | F24C 7/087 219/445.1 |
| 4,615,014 A * | 9/1986 | Gigandet | H05B 6/782 219/388 |
| 4,636,949 A * | 1/1987 | Longabaugh | G05B 19/042 219/442 |
| 4,665,292 A * | 5/1987 | Payne | F24C 15/106 219/448.12 |
| 4,692,596 A * | 9/1987 | Payne | F24C 15/106 219/448.12 |
| 4,700,052 A * | 10/1987 | Wolf | A47J 27/0802 219/497 |
| 4,740,664 A * | 4/1988 | Payne | G05D 23/24 219/448.12 |
| 4,796,207 A * | 1/1989 | Andre | A47J 27/62 219/494 |
| 4,812,963 A * | 3/1989 | Albrecht | A47J 27/62 219/492 |
| 4,913,038 A * | 4/1990 | Burkett | A47J 37/1266 99/329 R |
| 4,920,948 A * | 5/1990 | Koether | A21B 3/04 126/21 A |
| 4,927,998 A * | 5/1990 | Tamura | F24C 7/08 219/494 |
| 4,930,488 A * | 6/1990 | Pearman | F24C 3/12 126/39 BA |
| 4,968,515 A * | 11/1990 | Burkett | A47J 27/62 219/492 |
| 4,990,749 A * | 2/1991 | Devine | A47J 27/62 219/214 |
| 5,029,244 A * | 7/1991 | Fowler | F24C 7/087 219/492 |
| 5,044,262 A * | 9/1991 | Burkett | A47J 27/62 219/492 |
| 5,096,116 A * | 3/1992 | Akamatu | A47J 27/62 126/39 G |
| 5,096,725 A * | 3/1992 | Kim | A47J 27/62 426/233 |
| 5,111,027 A * | 5/1992 | Fowler | F24C 7/087 219/492 |
| 5,171,974 A * | 12/1992 | Koether | F24C 7/08 219/413 |
| 5,186,097 A * | 2/1993 | Vaseloff | A47J 37/1266 219/492 |
| 5,193,439 A * | 3/1993 | Finesman | A47J 37/0842 219/492 |
| 5,197,375 A * | 3/1993 | Rosenbrock | A21B 1/40 219/388 |
| 5,253,564 A * | 10/1993 | Rosenbrock | A21B 1/40 99/326 |
| 5,285,053 A * | 2/1994 | Fowler | F24C 7/087 219/492 |
| 5,310,110 A * | 5/1994 | Akamatsu | A47J 27/62 126/39 G |
| 5,321,229 A * | 6/1994 | Holling | F24C 7/087 219/445.1 |
| 5,362,946 A * | 11/1994 | Matsushima | F24C 7/08 219/492 |
| 5,367,145 A * | 11/1994 | Takagi | F24C 7/087 219/494 |
| 5,426,580 A * | 6/1995 | Yoshida | A21B 7/005 700/14 |
| 5,454,427 A * | 10/1995 | Westbrooks, Jr. | A23L 3/365 165/267 |
| 5,477,032 A * | 12/1995 | Fowler | F24C 7/087 219/483 |
| 5,528,018 A * | 6/1996 | Burkett | F24C 7/087 219/413 |
| 5,589,211 A * | 12/1996 | Cox | A01K 41/00 426/298 |
| 5,598,767 A * | 2/1997 | Minari | A47J 37/1266 99/332 |
| 5,618,460 A * | 4/1997 | Fowler | F24C 7/087 219/483 |
| 5,628,242 A * | 5/1997 | Higley | A47J 37/0713 126/25 R |
| 5,639,023 A * | 6/1997 | Hild | A47J 31/56 126/374.1 |
| 5,688,422 A * | 11/1997 | Landwehr | A47J 37/00 219/412 |
| 5,786,568 A * | 7/1998 | McKinney | A21B 1/02 219/399 |
| 5,919,039 A * | 7/1999 | Shaw | A21B 1/48 219/388 |
| 5,939,118 A * | 8/1999 | Cox | A01K 41/00 426/298 |
| 5,947,370 A * | 9/1999 | Rona | F23N 1/022 236/20 A |
| 6,043,461 A * | 3/2000 | Holling | F24C 7/087 219/445.1 |
| 6,063,421 A * | 5/2000 | Barravecchio | A47J 27/18 426/231 |
| 6,080,972 A * | 6/2000 | May | A21B 1/02 219/486 |
| 6,140,619 A * | 10/2000 | Couch | F24C 7/087 219/413 |
| 6,252,209 B1 * | 6/2001 | Liepold | G05D 23/1913 219/501 |
| 6,313,654 B1 * | 11/2001 | Nansai | G01R 31/01 219/412 |
| 6,355,914 B1 * | 3/2002 | Stockley | A47J 37/0623 219/398 |
| 6,449,534 B1 * | 9/2002 | Stewart | G05D 23/1931 700/205 |
| 6,459,919 B1 * | 10/2002 | Lys | A61N 5/0616 315/291 |
| 6,481,433 B1 * | 11/2002 | Schjerven, Sr. | A21B 1/245 126/116 A |
| 6,624,396 B2 * | 9/2003 | Witt | A21B 1/42 219/388 |
| 6,684,875 B1 * | 2/2004 | Schjerven, Sr. | A21B 1/245 126/116 A |
| 6,707,014 B1 * | 3/2004 | Corey | A23L 3/185 198/844.1 |
| 6,777,652 B2 * | 8/2004 | Stockley | A47J 37/0623 219/398 |

(56) References Cited

U.S. PATENT DOCUMENTS

| | | | | |
|---|---|---|---|---|
| 6,784,404 B2* | 8/2004 | Meyer | F24C 14/02 | 219/391 |
| 6,817,757 B1* | 11/2004 | Wallace | F24C 7/08 | 340/870.17 |
| 6,866,417 B2* | 3/2005 | Gunawardena | G05D 23/1935 | 374/121 |
| 6,979,804 B1* | 12/2005 | Boyer | F24C 7/087 | 219/412 |
| 6,993,418 B2* | 1/2006 | Stewart | G05D 23/1931 | 700/153 |
| 7,087,867 B2* | 8/2006 | Stockley | A47J 37/0623 | 219/413 |
| 7,117,124 B2* | 10/2006 | Yamada | G05D 23/0235 | 700/79 |
| 7,126,088 B2* | 10/2006 | Horton | F24C 7/082 | 219/412 |
| 7,159,153 B2* | 1/2007 | Kim | G06F 21/87 | 714/48 |
| 7,196,293 B2* | 3/2007 | Britto | H01R 13/7038 | 219/387 |
| 7,205,016 B2* | 4/2007 | Garwood | A23B 4/10 | 426/108 |
| 7,227,107 B2* | 6/2007 | McLemore | A47J 36/32 | 219/481 |
| 7,235,762 B2* | 6/2007 | Gagas | F24C 7/087 | 219/385 |
| 7,255,100 B2* | 8/2007 | Repper | F23N 1/005 | 126/39 BA |
| 7,279,659 B2* | 10/2007 | Gagas | F24C 7/08 | 219/385 |
| 7,308,296 B2* | 12/2007 | Lys | A61N 5/0616 | 600/407 |
| 7,420,140 B2* | 9/2008 | Lenhart, Jr. | F24C 1/04 | 219/394 |
| 7,483,769 B2* | 1/2009 | Hoover | G05D 23/1931 | 700/153 |
| 7,488,919 B2* | 2/2009 | Gagas | F24C 7/087 | 219/400 |
| 7,516,692 B2* | 4/2009 | Pirkle | A47J 27/62 | 99/333 |
| 7,554,061 B2* | 6/2009 | Ruther | F24C 7/08 | 219/492 |
| 7,573,005 B2* | 8/2009 | Clothier | H05B 3/746 | 219/412 |
| 7,642,488 B2* | 1/2010 | Kim | F24C 7/06 | 219/400 |
| 7,793,649 B2* | 9/2010 | Barkhouse | F23N 1/002 | 126/19 R |
| 7,798,139 B2* | 9/2010 | Gagas | A47J 37/0704 | 126/1 R |
| 7,921,767 B2* | 4/2011 | Cook | A47J 37/045 | 219/398 |
| 8,058,588 B2* | 11/2011 | Gagas | A47J 36/2483 | 219/400 |
| RE43,035 E* | 12/2011 | Schjerven, Sr. | A21B 1/245 | 126/116 A |
| 8,087,407 B2* | 1/2012 | Wiker | A21B 1/40 | 126/19 R |
| 8,258,437 B2* | 9/2012 | Donarski | H05B 1/0266 | 219/443.1 |
| 8,281,779 B2* | 10/2012 | Wiker | A21B 1/40 | 126/21 A |
| 8,371,285 B2* | 2/2013 | Wiker | A21B 1/40 | 126/19 R |
| 8,610,036 B2* | 12/2013 | Ewell, Jr. | H05B 1/0252 | 219/412 |
| 8,839,779 B2* | 9/2014 | Wiker | A21B 1/40 | 126/19 R |
| 8,859,941 B2* | 10/2014 | Gladhill | F24C 7/085 | 219/391 |
| 8,869,679 B2* | 10/2014 | Ryan | A23L 7/161 | 219/482 |
| 8,921,743 B2* | 12/2014 | Ewell, Jr. | H05B 1/0261 | 219/412 |
| 9,289,096 B2* | 3/2016 | Barkhouse | A47J 27/62 | |
| 9,329,606 B2* | 5/2016 | Barkhouse | F23N 1/002 | |
| 9,389,020 B2* | 7/2016 | Ewell | H05B 1/0261 | |
| 2002/0005401 A1* | 1/2002 | Meyer | F24C 14/02 | 219/413 |
| 2003/0034342 A1* | 2/2003 | Stockley | A47J 37/0623 | 219/486 |
| 2003/0100837 A1* | 5/2003 | Lys | A61N 5/0616 | 600/476 |
| 2003/0175392 A1* | 9/2003 | Garwood | A23B 4/10 | 426/392 |
| 2003/0218002 A1* | 11/2003 | Fulton | F24C 7/087 | 219/490 |
| 2004/0081729 A1* | 4/2004 | Garwood | A23B 4/10 | 426/235 |
| 2005/0000958 A1* | 1/2005 | Stockley | A47J 37/0623 | 219/486 |
| 2005/0208188 A1* | 9/2005 | Garwood | A23B 4/10 | 426/392 |
| 2005/0274712 A1* | 12/2005 | Gagas | F24C 7/087 | 219/494 |
| 2006/0043087 A1* | 3/2006 | Gagas | F24C 7/087 | 219/391 |
| 2006/0049172 A1* | 3/2006 | Gagas | F24C 7/08 | 219/521 |
| 2007/0039945 A1* | 2/2007 | Stockley | A47J 37/0623 | 219/486 |
| 2007/0045277 A1* | 3/2007 | Smarda | F24C 7/087 | 219/386 |
| 2007/0084849 A1* | 4/2007 | Smith | F24C 7/08 | 219/413 |
| 2008/0011736 A1* | 1/2008 | Lenhart | F24C 1/04 | 219/412 |
| 2008/0173631 A1* | 7/2008 | Gagas | A47J 36/2483 | 219/400 |
| 2008/0183081 A1* | 7/2008 | Lys | A61N 5/0616 | 600/477 |
| 2009/0017404 A1* | 1/2009 | White | F24C 3/12 | 431/12 |
| 2011/0083562 A1* | 4/2011 | Ryan | H05B 1/0261 | 99/323.7 |
| 2011/0284518 A1* | 11/2011 | Elston, III | F24C 7/087 | 219/391 |
| 2012/0074121 A1* | 3/2012 | Gagas | A47J 36/2483 | 219/385 |
| 2012/0294992 A1* | 11/2012 | Sager | F24C 7/08 | 426/231 |
| 2013/0269539 A1* | 10/2013 | Polt | F24C 3/122 | 99/331 |
| 2014/0060339 A1* | 3/2014 | Jeon | F24C 15/327 | 99/330 |
| 2014/0116267 A1* | 5/2014 | Hochschild, Jr. | A47J 36/2483 | 99/473 |

OTHER PUBLICATIONS

European Examination Report dated May 24, 2017 in corresponding European Patent Application No. 15163408.6.

* cited by examiner

60:61,61
70:71,72,75

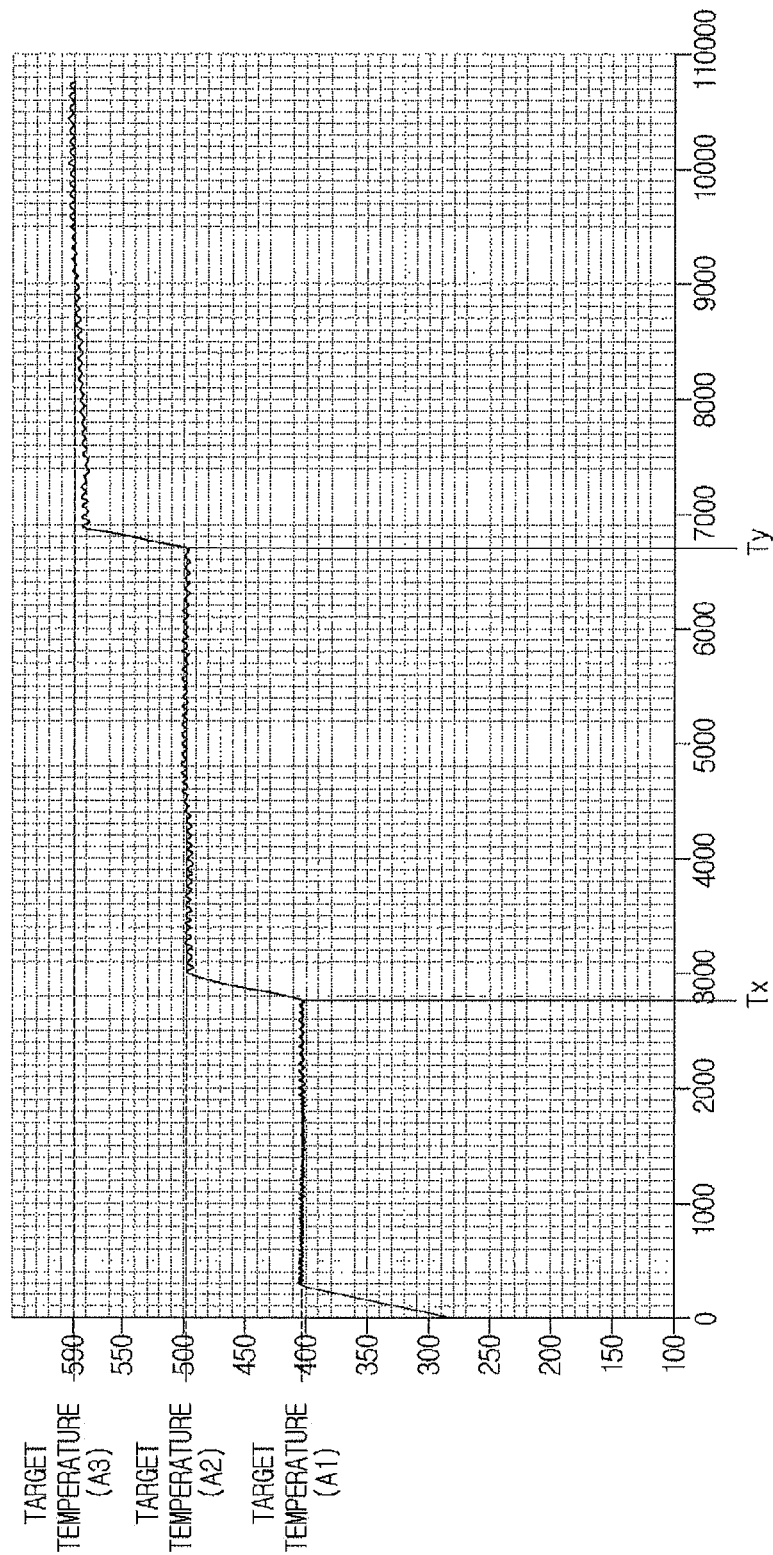

OVEN AND METHOD FOR CONTROLLING THE SAME

CROSS-REFERENCE TO RELATED APPLICATIONS

This application claims the benefit of Korean Patent Application No. 10-2014-0044306, filed on Apr. 14, 2014 in the Korean Intellectual Property Office, the disclosure of which is incorporated herein by reference.

BACKGROUND

1. Field

Embodiments of the present disclosure relate to an oven that controls on/off of a heater and a method of controlling the same.

2. Description of the Related Art

Various electronic products, such as TVs, a washing machine, a refrigerator, an air-conditioner, and the like, are produced to make modern life more comfortable and convenient. Among these electronic products, in particular, cooking appliances enable simple cooking of various foods and thus give convenience to busy professionals or housewives participating in social activities. For this reason, these cooking appliances are essential electronic products for modern people.

Ovens, which are one form of cooking appliance, cook foods by heat. Such ovens are divided into a gas oven and an electric oven according to heat source. A gas oven uses gas as a heat source and heats and cooks food using flames ignited by a plurality of burners, and an electric oven uses electricity as a heat source and heats and cooks food using heat emitted from a heater. That is, electric ovens use electricity as a heat source and cook food using radiant heat, convection heat, and conduction heat. Such electric ovens simultaneously heat an outside and an inside of food to be cooked and thus exhibit a faster cooking speed, higher thermal efficiency, and stability than gas ovens and, accordingly, use thereof is increasing.

In general, an electric oven includes a main body that defines an exterior appearance of the oven and has an open front surface through which food to be cooked is introduced into a cooking compartment defined in the main body and a door installed at a front side of the main body so as to selectively open or close the cooking compartment. The door of the electric oven consists of plural pieces of glass to prevent heat in the cooking compartment from being emitted outside and some of the pieces of glass have a heat-reflective coating surface.

SUMMARY

Therefore, it is an aspect of the present disclosure to provide an oven that controls on/off operations of a heater and a method of controlling the oven.

Additional aspects of the disclosure will be set forth in part in the description which follows and, in part, will be obvious from the description, or may be learned by practice of the disclosure.

In accordance with one aspect of the present disclosure, an oven includes at least one heater arranged in a cooking compartment, a temperature sensor to sense a temperature of the cooking compartment every preset period of time, and a control unit to reset on/off times for each period of the heater based on a preset target temperature and a current temperature and previous temperature of the cooking compartment sensed by the temperature sensor and to control the heater to be driven according to the reset on/off times.

The control unit may control driving of the heater such that the heater is turned on until prior to a preheating completion time and may reset on/off times for a period after the preheating completion time of the heater.

The current temperature may be a temperature of the cooking compartment at a time at which the corresponding period starts.

The previous temperature may b a temperature of the cooking compartment at a time at which a previous period starts.

The oven may further include a storage unit to store on/off times of the heater preset according to temperature differences.

The control unit may extract the on/off times of the heater stored in the storage unit, based on a difference between the target temperature and a temperature of the cooking compartment at a preheating completion time.

The control unit may calculate on/off increase or decrease times of the heater based on the target temperature, the current temperature, and the previous temperature.

The control unit may calculate first on/off increase or decrease times of the heater by comparing the target temperature and the current temperature.

The control unit may calculate the first on/off increase or decrease times so that, for a period at which the current temperature exceeds the target temperature, the on time of the heater decreases and the off time of the heater increases.

The control unit may calculate the first on/off increase or decrease times so that, for a period at which the current temperature is lower than the target temperature, the on time of the heater increases and the off time of the heater decreases.

The control unit may calculate second on/off increase or decrease times of the heater by comparing the current temperature and the previous temperature.

The control unit may calculate the second on/off increase or decrease times for a period at which the current temperature and the previous temperature are identical, through comparison between the target temperature and the current temperature.

The control unit may calculate the second on/off increase or decrease times so that, for a period at which the current temperature exceeds the previous temperature, the on time of the heater decreases and the off time of the heater increases.

The control unit may calculate the second on/off increase or decrease time so that, for a period at which the current temperature is lower than the previous temperature, the on time of the heater increases and the off time of the heater decreases.

The control unit may reset on/off times of the heater by accumulating the calculated on/off increase or decrease times of the heater to the extracted on/off times.

The control unit may adjust an interval or frequency of the period.

In accordance with another aspect of the present disclosure, an oven includes at least one heater installed inside a cooking compartment, a temperature sensor to sense a temperature of the cooking compartment, an input unit through which a target temperature of the cooking compartment is input by a user, and a control unit to control the heater to be turned on until the temperature of the cooking compartment reaches a preheating temperature and to control the heater to be turned on/off based on the target temperature and the temperature of the cooking compartment after the temperature of the cooking compartment reaches the preheating temperature, when the target temperature is input.

The control unit may control on/off of the heater so that the temperature of the cooking compartment is converged to the target temperature.

The control unit may periodically set on/off times of the heater and control driving of the heater according to the set on/off times.

In accordance with another aspect of the present disclosure, a method of controlling an oven includes sensing a temperature of a cooking compartment every preset period of time, the sensing being performed by a temperature sensor, resetting on/off times for each period of a heater based on a preset target temperature and a current temperature and previous temperature of the cooking compartment sensed by the temperature sensor, and controlling driving of the heater according to the reset on/off times.

The resetting may include controlling the heater to be turned on until prior to a preheating completion time and resetting on/off times for a period after the preheating completion time of the heater.

The method may further include storing on/off times of the heater preset according to temperature differences.

The method may further include extracting the on/off times of the heater stored in the storage unit based on a difference between the target temperature and a temperature of the cooking compartment at a preheating completion time.

The resetting may include calculating on/off increase or decrease times of the heater based on the target temperature, the current temperature, and the previous temperature.

The resetting may include calculating first on/off increase or decrease times of the heater by comparing the target temperature and the current temperature.

The calculating of the first on/off increase or decrease times may include calculating first on/off increase or decrease times so that, for a period at which the current temperature exceeds the target temperature, the on time of the heater decreases and the off time of the heater increases.

The calculating of the first on/off increase or decrease times may include calculating first on/off increase or decrease times so that, for a period at which the current temperature is lower than the target temperature, the on time of the heater increases.

The resetting may include calculating second on/off increase or decrease times of the heater by comparing the current temperature and the previous temperature.

The calculating of the second on/off increase or decrease times may include calculating second on/off increase or decrease times for a period at which the current temperature is identical to the previous temperature, through comparison between the target temperature and the current temperature.

The calculating of the second on/off increase or decrease times may include calculating second on/off increase or decrease times so that, for a period at which the current temperature is higher than the previous temperature, the on time of the heater decreases and the off time of the heater increases.

The calculating of the second on/off increase or decrease times may include calculating second on/off increase or decrease times so that, for a period at which the current temperature is lower than the previous temperature, the on time of the heater increases and the off time of the heater decreases.

The resetting may include resetting on/off times of the heater by accumulating the calculated on/off increase or decrease times of the heater to the extracted on/off times.

The method may further include adjusting an interval or frequency of the period.

By controlling on/off of the heater using the oven and a control method therefor, a ripple phenomenon occurring because a target temperature does not remain the same may be decreased. Thus, temperature differences may be reduced during cooking of food and, accordingly, cooking ability may be enhanced.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 illustrates an internal temperature with respect to a target temperature of a cooking compartment.

DETAILED DESCRIPTION

Figure 1:
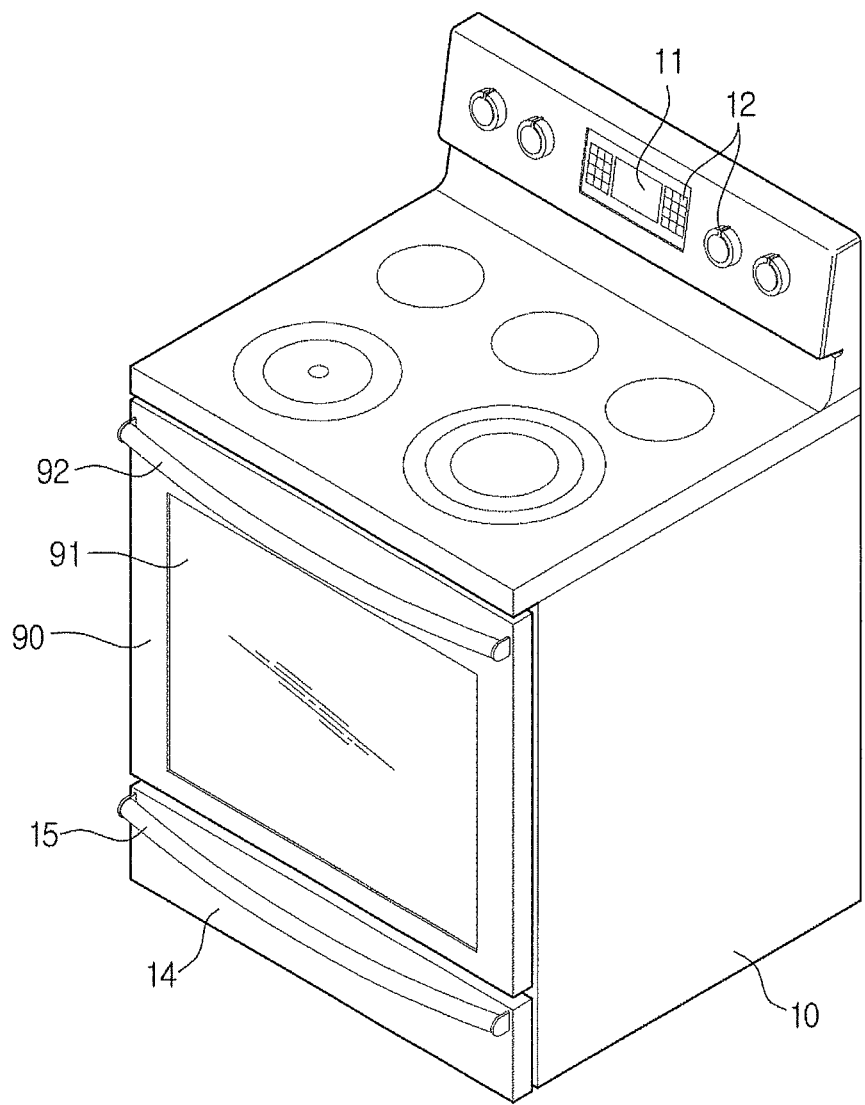
FIGS. 1 and 2 are perspective views of an oven according to an embodiment of the present disclosure.

Reference will now be made in detail to the embodiments of the present disclosure, examples of which are illustrated in the accompanying drawings, wherein like reference numerals refer to like elements throughout.

Hereinafter, an oven and a control method therefor according to embodiments of the present disclosure will be described in detail with reference to the accompanying drawings.

Figure 2:
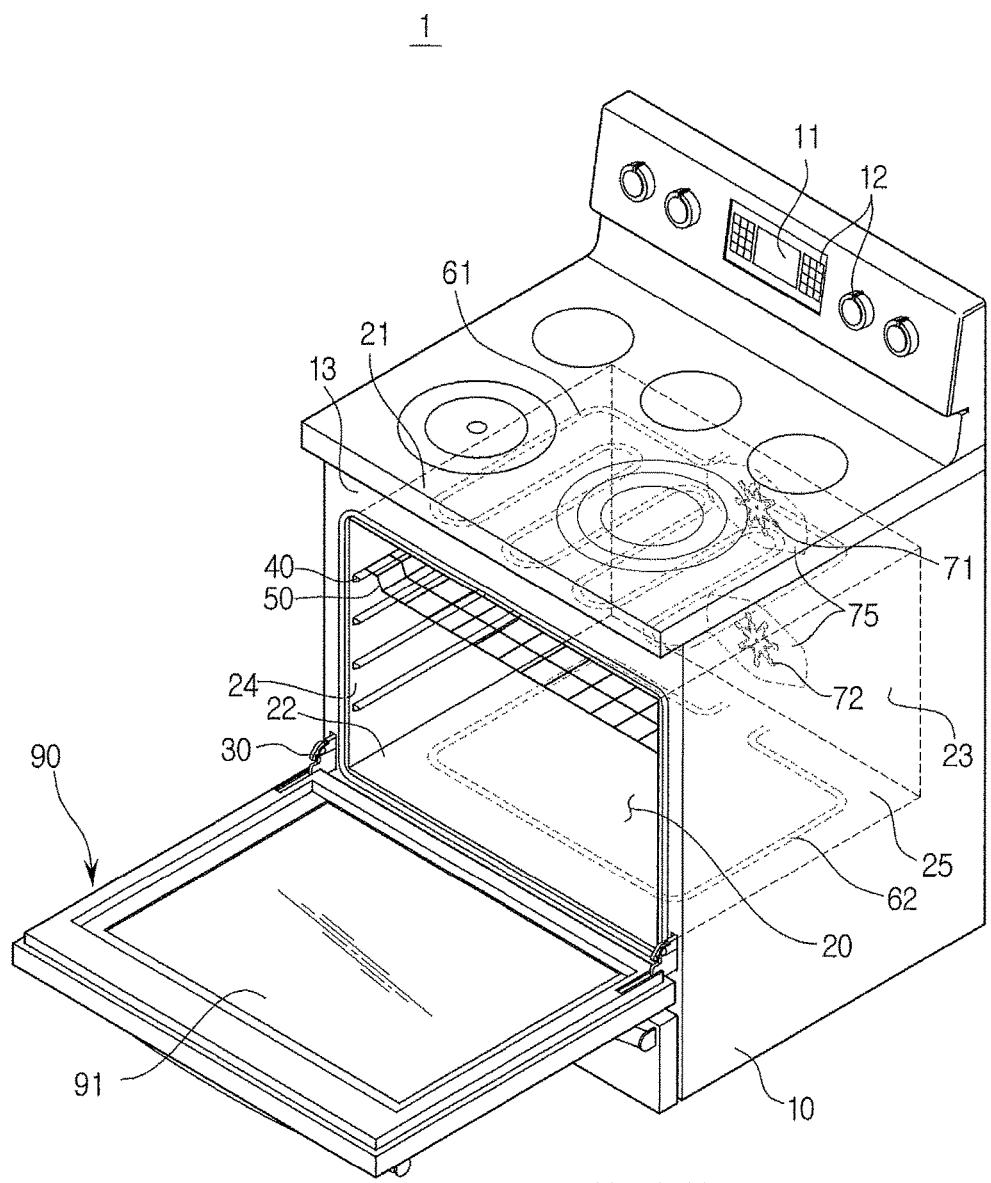

FIGS. 1 and 2 are perspective views of an oven 1 according to an embodiment of the present disclosure. FIG. 1 is a perspective view illustrating a state in which a door of the oven 1 is closed. FIG. 2 is a perspective view illustrating a state in which the door of the oven 1 is open.

Referring to FIGS. 1 and 2, the oven 1 includes a main body 10, a cooking compartment 20 arranged in the main body 10, and a heating device to heat the cooking compartment 20.

The main body 10 may be provided at an upper portion thereof with an input unit 12 through which various commands for cooking are input by a user and a display unit 11 to display various cooking information to the user. For example, a user may input commands for starting/ending cooking, selection of cooking menus, cooking time, temperature setting, and the like via the input unit 12 and may check current time, menu selection screen, operating conditions, cooking progress/remaining time, current temperature, setting temperature, and the like via the display unit 11.

The input unit 12 may take the form of buttons or rotatable knobs or may be a software form such as a touch screen. The display unit 11 may be a liquid crystal display (LCD), an organic light emitting diode (OLED), or the like, but embodiments of the present disclosure are not limited thereto.

In FIG. 1, the input unit 12 and the display unit 11 are arranged at an upper rear end of the main body 10. However, in another embodiment, according to user convenience, the input unit 12 and the display unit 11 may be arranged at an upper front end of the main body 10 or at other portions thereof. That is, the positions of the input unit 12 and the display unit 11 are not limited.

The main body 10 may include the cooking compartment 20, which is a space where foods are cooked, and a storage cabinet 14 disposed below the cooking compartment 20 and storing various cooking utensils.

The storage cabinet 14 may be configured to be inserted and withdrawn along guide rails (not shown), guide grooves (not shown), or the like using a handle 15 installed at a front surface of the storage cabinet 14 and rollers (not shown) installed at opposite ends thereof.

The cooking compartment 20 may have a hexahedral shape with an open surface. In particular, the cooking compartment 20 has an upper surface 21, a lower surface 22, a rear surface 23, a left-side surface 24, and a right-side surface 25 and a front surface of the cooking compartment 20 may be opened and closed by a door 90. The door 90 includes hinge elements 30 to be rotatable upward and downward, and a user may open and close the cooking compartment 20 by rotating the door 90 while grasping the handle 92 installed at an upper end of the door 90. Installation positions of the hinge elements 30 and the handle 15 may be different from what is illustrated in FIG. 2 and a rotation direction of the door 90 may vary according to the installation positions.

Meanwhile, when the cooking compartment 20 is opened, foods may be placed in or taken out of the cooking compartment 20. When the cooking compartment 20 is closed, foods may be cooked by heating the cooking compartment 20 according to set values. To check whether food is inside the cooking compartment 20, cooking states of foods, and the like, the door 90 may be provided with a transparent window 91 such that the inside of the cooking compartment 20 is visible from outside.

To thermally insulate the cooking compartment 20 from the outside, the upper surface 21, the lower surface 22, the rear surface 23, the left-side surface 24, and the right-side surface 25 of the cooking compartment 20 may be formed of a heat insulating material or may be provided at respective outer sides thereof with heat insulating materials. Likewise, the transparent window 91 may be formed of a heat insulating material and the door 90 may be completely or partially formed of a heat insulating material.

The cooking compartment 20 is provided with a grill shelf 50 having a lattice shape and detachably arranged to hold food to be cooked and is provided at opposite side surfaces 24 and 25 thereof with support bodies 40 to support opposite ends of the grill shelf 50. As illustrated in FIG. 2, the grill shelf 50 may include a plurality of grill shelves 50. In addition, the support bodies 40 may include at least a pair of support bodies 40, in particular pairs of support bodies 40 having various heights so as to variously adjust installation height of the grill shelf 50.

The cooking compartment 20 is provided inside thereof with a heating device to cook foods, and the heating device may include a heater module 60 to perform cooking by directly applying radiation to food and a convection module 70 to perform cooking by circulating heated air.

The heater module 60 may include an upper heater 61 arranged at the upper surface 21 of the cooking compartment 20 and a lower heater 62 arranged at the lower surface 22 of the cooking compartment 20. The convection module 70 may include two convection fans 71 and 72 arranged at the rear surface 23 of the cooking compartment 20. The number of heaters constituting the heater module 60 or the number of convection fans constituting the convection module 70 is not limited to the embodiment illustrated in FIG. 2.

For example, the heater module 60 may further include a rear heater (not shown) coupled to the convection fans 71 and 72, and the convection module 70 may include a single convection fan. For convenience of explanation, hereinafter, a case in which the heater module 60 includes the upper and lower heaters 61 and 62 and the convection module 70 includes the convection fans 71 and 72 will be described.

The heater module 60 allows direct heating of food inside the cooking compartment 20 through radiation. The upper heater 61 is arranged at the upper surface 21 of the cooking compartment 20 to be exposed and thus may heat an upper side of the food. The lower heater 62 is arranged in an unexposed state at the lower surface 22 of the cooking compartment 20 so as to be protected from food, oil generated therefrom, or the like, to heat a lower side of the food.

The convection module 70 shortens cooking time of food by circulating air heated by the heater module 60. In other words, heated air is circulated inside the cooking compartment 20 as the convection fans 71 and 72 rotate, and circulated heat is added to the radiation of the heater module 60 and thus increases cooking speed of the food.

The convection module 70 may further include a convection fan accommodation unit (not shown) to accommodate the convection fans 71 and 72 and partition plates 75 to separate the cooking compartment 20 from the convection fans 71 and 72 or to separate the cooking compartment 20 from the convection fan accommodation unit. The partition plates 75 may be provided with a plurality of holes to suction air of the cooking compartment 20 into the convection fan accommodation unit and to discharge air circulated by the convection fans 71 and 72 to the cooking compartment 20.

In a general mode, food is cooked by driving only the heater module 60. On the other hand, when rapid cooking or a convection mode is selected by a user, the convection module 70 is driven together with the heater module 60. That is, the oven 1 cooks food using radiation generated by the heater module 60 and in the convection mode, cooking of the food is assisted by rotation of the convection fans 71 and 72.

In both a general mode and a convection mode, the heater module 60 is basically driven to cook food, and the heater module 60 repeats on and off states so that food is cooked at a set temperature.

In this regard, when the on/off states of the heater module 60 are repeated, a "temperature ripple phenomenon" in which internal temperature of the cooking compartment 20 fluctuates in a predetermined range occurs. Conversion of the heater module 60 to the on state or off state does not immediately affect the internal temperature of the cooking compartment 20 and requires a certain period of time to affect the inside of the cooking compartment 20. Thus, when on/off of the heater module 60 is simply controlled at a point at which a temperature set by a user, i.e., a target temperature turns into a +/- delta temperature, an overshoot and an undershoot are repeated based on the target temperature and, accordingly, the temperature ripple phenomenon occurs. This will be described in detail with reference to FIG. 3.

Figure 3:
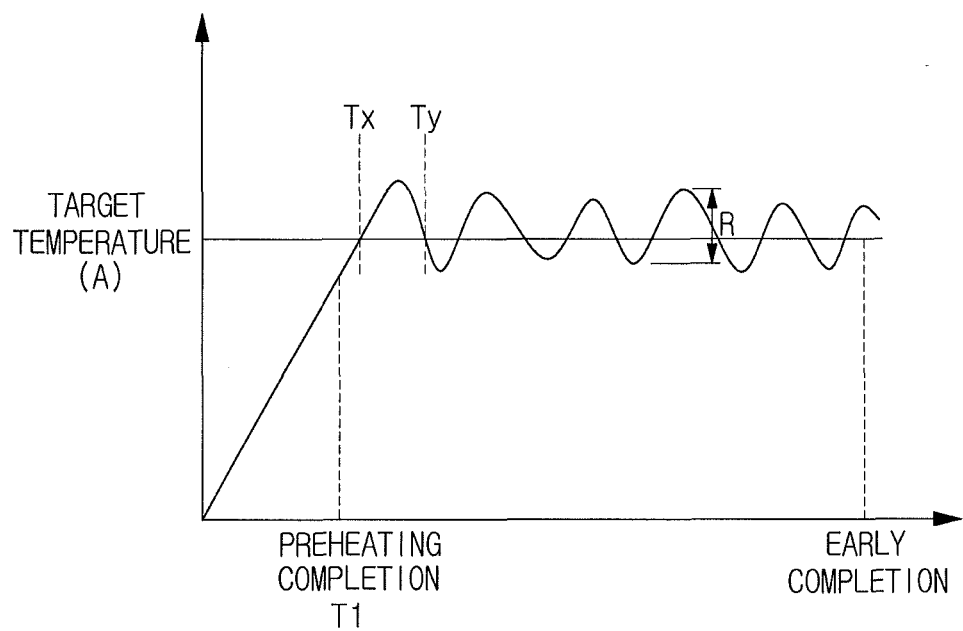
FIG. 3 is a diagram for explaining a temperature ripple phenomenon occurring according to on/off of a heater module.

FIG. 3 is a diagram for explaining the temperature ripple phenomenon occurring according to on/off of the heater module 60. In the following description in addition to the description with reference to FIG. 3, a temperature set via the input unit 12 is denoted as a target temperature A.

As illustrated in FIG. 3, the heater module 60 increases the internal temperature of the cooking compartment 20 while maintaining an on state to a time T1 at which preheating is completed. When a temperature at which preheating is completed (hereinafter, referred to as a preheating temperature) is unable to reach the target temperature A, the heater module 60 further maintains the on state for a predetermined period of time to allow the current temperature to approximate to the target temperature A. The heater module 60 is converted to an off state at a time Tx at which the current temperature reaches the target temperature A or immediately before the time Tx. In this regard, the internal temperature of the cooking compartment 20 exceeds the target temperature A by remaining heat of the heater module 60, and a predetermined period of time is needed until the target temperature A is reached. That is, an overshoot appears based on the target temperature A.

Meanwhile, to maintain the target temperature A, the heater module 60 is converted again to the on state at a time Ty at which the current temperature coincides with the target temperature A or immediately therebefore. Since time to heat the heater module 60 is required, the internal temperature of the cooking compartment 20 is reduced to less than the target temperature A and a predetermined period of time is needed to reach the target temperature A. That is, an undershoot appears based on the target temperature A.

As such, while on/off of the heater module 60 is repeated, the internal temperature of the cooking compartment 20 fluctuates in a predetermined range R such that the target temperature A does not remain the same until cooking is completed and the internal temperature exceeds the target temperature A or is reduced to less than the target temperature A. That is, a ripple phenomenon of the internal temperature of the cooking compartment 20 may occur. The temperature ripple phenomenon may increasingly or decreasingly occur according to on/off time or conversion time of on/off. In other words, the internal temperature of the cooking compartment 20 may fluctuate more widely or more narrowly according to how to control the on/off times of the heater module 60.

Hereinafter, elements of the oven 1 that enable reduction in the temperature ripple phenomenon through control of the on/off times of the heater module 60 and function of each element will be described.

Figure 4:
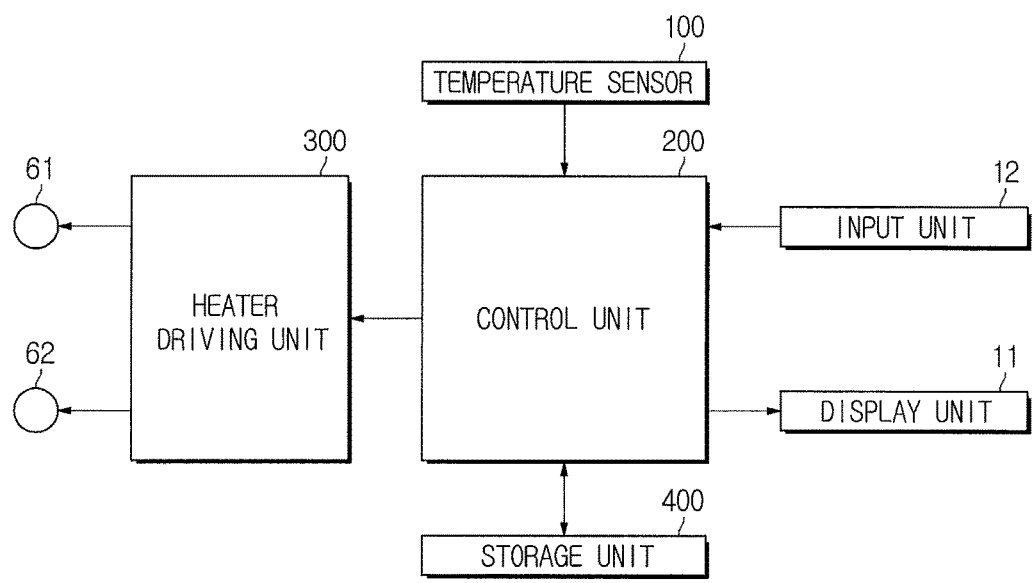
FIG. 4 is a control block diagram of the oven according to the embodiment of the present disclosure.

FIG. 4 is a control block diagram of the oven 1 according to the embodiment of the present disclosure.

Referring to FIG. 4, the oven 1 includes the input unit 12, the display unit 11, a temperature sensor 100, a control unit 200, a heater driving unit 300, and a storage unit 400.

As described above, the input unit 12 receives various commands for cooking from a user and the display unit 11 displays various cooking information to a user. A user may set the target temperature A needed for cooking through the input unit 12 and may check the set target temperature A via the display unit 11.

The temperature sensor 100 is installed in the cooking compartment 20 to sense the internal temperature of the cooking compartment 20 that varies according to on/off of the heater module 60. In particular, the temperature sensor 100 may be installed at at least one of the upper surface 21, the lower surface 22, the rear surface 23, the left-side surface 24, and the right-side surface 25 of the cooking compartment 20 and periodically senses the internal temperature of the cooking compartment 20 until cooking is completed. Temperature sensed by the temperature sensor 100 is transmitted to the control unit 200, and the control unit 200 controls on/off times of the heater module 60 based on the sensed temperature. Temperature sensing of the temperature sensor 100 and function of the control unit 200 based thereon will be described below.

The temperature sensor 100 may be a contact-type temperature sensor or a non-contact-type temperature sensor. In particular, the temperature sensor 100 may be at least one of a resistance temperature detector (RTD) temperature sensor using changes in resistance of a metal according to temperature changes, a thermistor temperature sensor using changes in resistance of a semiconductor according to temperature changes, a thermocouple temperature sensor using electromotive force generated at opposite ends of a junction between two metal wires of different materials, and an integrated circuit (IC) temperature sensor using voltage at opposite terminals of a transistor that varies according to temperature or current-voltage characteristics of a P-N junction unit thereof. However, embodiments of the present disclosure are not limited to the above examples and the temperature sensor 100 may be any other type of sensor so long as the sensor is able to sense the internal temperature of the cooking compartment 20.

The control unit 200 controls on/off times or time at which the on/off states are sustained of the heater module 60, based on the internal temperature of the cooking compartment 20.

Figure 5:
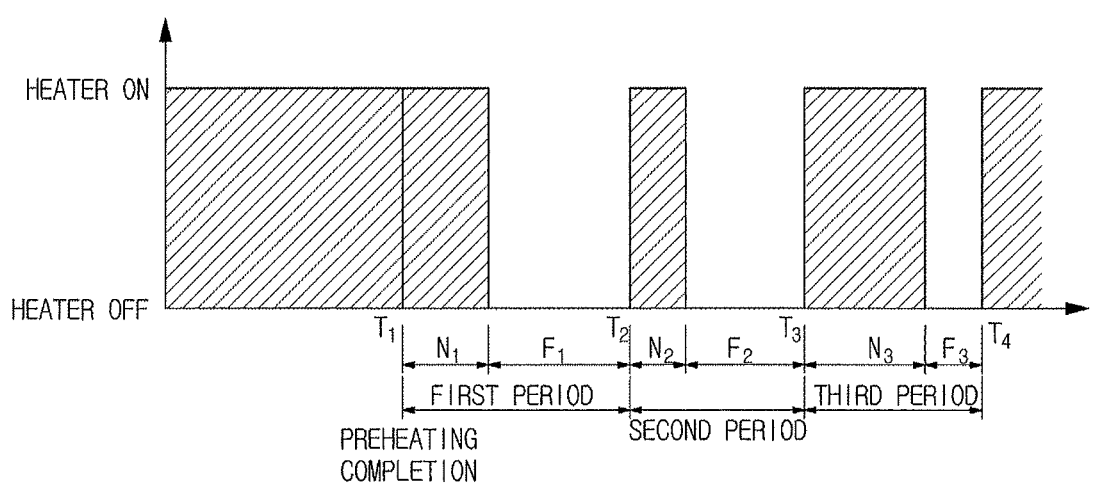
FIG. 5 is a diagram illustrating time-based control of on/off of the heater module.
Figure 6A:
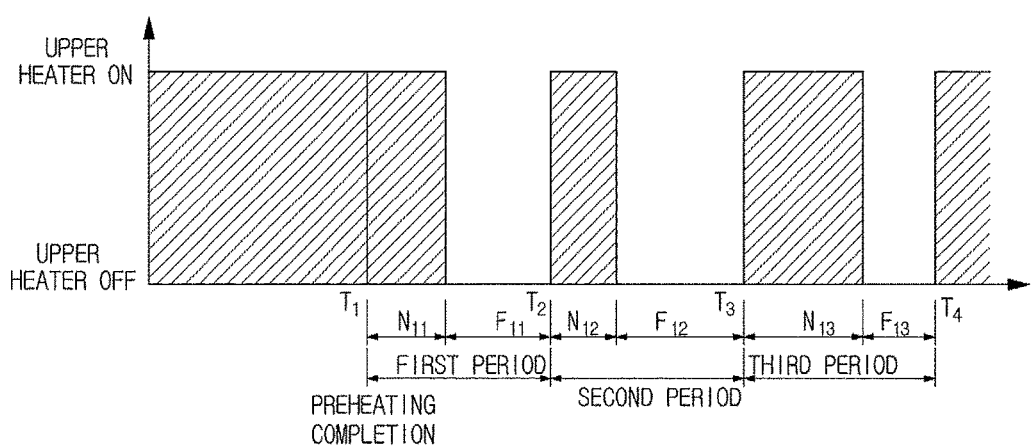
FIGS. 6A and 6B are diagrams for explaining on/off control of each of a plurality of heaters constituting the heater module.
Figure 6B:
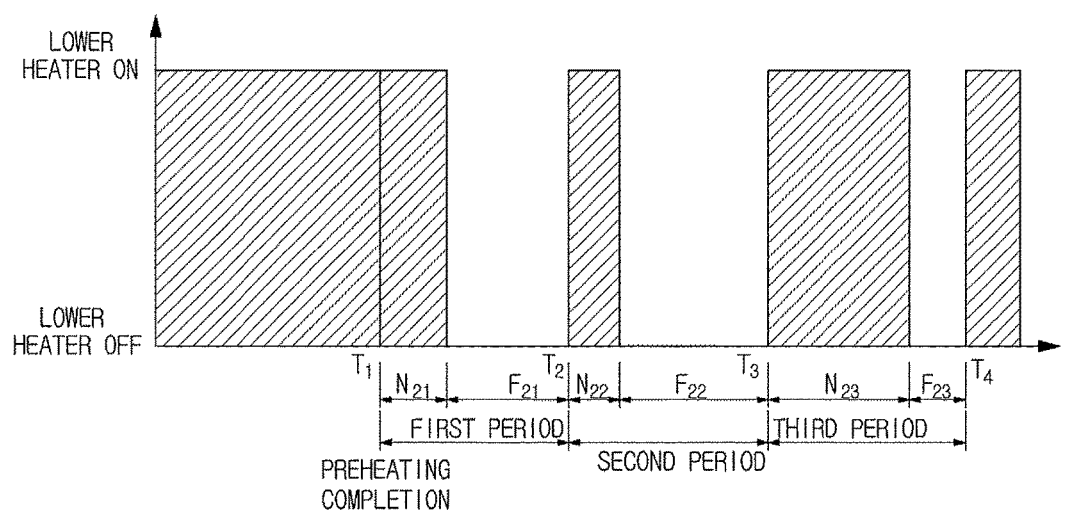

FIG. 5 is a diagram illustrating time-based control of on/off of the heater module 60. FIGS. 6A and 6B are diagrams for explaining on/off control of each of a plurality of heaters constituting the heater module 60.

Referring to FIG. 5, the control unit 200 turns the heater module 60 on and starts preheating to cook food. In addition, the control unit 200 determines whether a time to sustain the on state of the heater module 60 reaches a preheating completion time T1 or whether the internal temperature of the cooking compartment 20 reaches a preheating temperature. For this operation, the preheating completion time T1 or the preheating temperature is preset and stored in the storage unit 400. For convenience of explanation, hereinafter, a case in which the preheating completion time T1 is pre-stored in the storage unit 400 and the control unit 200 determines whether or not preheating is completed, using the preheating completion time T1 will be described.

When determining that the preheating completion time T1 is reached, the control unit 200 sets on/off times of the heater module 60 according to each period and controls the heater module 60 to perform on/off according to the set on/off times. In this regard, the "on" time of the heater module 60 means a time at which the on state of the heater module 60 is sustained, and the "off" time of the heater module 60 means a time at which the off state of the heater module 60 is sustained.

As described above, the temperature sensor 100 periodically senses the internal temperature of the cooking compartment 20 from a preheating start time to a time at which cooking is completed and transmits the sensed temperature information to the control unit 200. In this regard, a sensing period of the temperature sensor 100 is pre-set and stored in the storage unit 400. The sensing period need not be constant and sensing periods prior to and after the preheating completion time T1 may be differently set.

For example, the temperature sensor 100 senses the temperature of the cooking compartment 20 at times T1, T2, T3, and T4, and an interval between T1 and T2, an interval between T2 and T3, and an interval between T3 to T4 may be constant or differently set. In this regard, the interval between T1 and T2 may be defined as a first period, the interval between T2 and T3 may be defined as a second period, and the interval between T3 and T4 may be defined as a third period. In addition, the temperature sensor 100 also senses the internal temperature of the cooking compartment 20 prior to the preheating completion time T1.

The control unit 200 sets on/off times of the heater module 60 according to each period, based on the temperature sensed by the temperature sensor 100.

In particular, the control unit 200 sets the on/off times for the first period of the heater module 60 at the preheating completion time T1 by comparing the target temperature A input by a user, a current temperature sensed by the temperature sensor 100 at T1, and a previous temperature sensed by the temperature sensor 100 before T1. In addition, the control unit 200 sets the on/off times for the second period of the heater module 60 at a time T2 at which the first period is completed by comparing the target temperature A, a current temperature sensed by the temperature sensor 100 at T2, and a previous temperature sensed by the temperature sensor 100 before T2, i.e., a temperature sensed by the temperature sensor 100 at T1.

Similarly, the control unit 200 sets the on/off time for the third period of the heater module 60 at a second period completion time T3 by comparing the target temperature A, a current temperature sensed by the temperature sensor 100 at T3, and a previous temperature sensed by the temperature sensor 100 before T3, i.e., a temperature sensed by the temperature sensor 100 at T2.

As described above, the control unit 200 may compare the target temperature A, a current temperature and a previous temperature every period and set on/off times for operation of the heater module 60 at the corresponding period through the comparison. A method of comparing the target temperature A, a current temperature, and a previous temperature every period, performed by the control unit 200 and a method of setting on/off times by comparison thereamong will be described below in further detail.

The control unit 200 controls the heater module 60 to be driven according to set time. In particular, when the on time and off time for the first period of the heater module 60 are set at N1 and F1, respectively, the control unit 200 controls the heater module 60 to maintain the on state for an interval between T1 and N1 and to convert the on state to an off state after N1 elapses and maintain F1. When the on time and off time for the second period of the heater module 60 are set at N2 and F2, respectively, the control unit 200 controls the heater module 60 to perform conversion to an on state at T2 and maintain the on state for N2 and to convert the on state to an off state and maintain the off state for F2.

Similarly, when the on time and off time for the third period of the heater module 60 are set at N3 and F3, respectively, the control unit 200 controls the heater module 60 to perform conversion to an on state at T3 and maintain the on state for N3 and to maintain an off state for F3. As such, the control unit 200 resets on/off times at the beginning of each period and thus the on/off times may vary according to each period. For example, the on time N1 of the first period, the on time N2 of the second period and the on time N3 of the third period of the heater module 60 may be differently set.

As illustrated in FIGS. 6A and 6B, the control unit 200 may set on/off times according to each heater constituting the heater module 60 and control the heater module 60 to be driven according to the on/off times of each heater. In other words, the control unit 200 may set, at the preheating completion time T1, on/off times of the first period of the upper heater 61 at N11 and F11, respectively and on/off times of the first period of the lower heater 62 at N21 and F21, respectively. In addition, the control unit 200 may set, at the first period completion time T2, on/off times of the second period of the upper heater 61 at N12 and F12, respectively and on/off times of the second period of the lower heater 62 at N22 and F22, respectively.

Similarly, the control unit 200 may set, at the second period completion time T3, on/off times of the third period of the upper heater 61 at N13 and F13, respectively and on/off times of the third period of the lower heater 62 at N23 and F23, respectively. Thus, the on/off times may vary according to position of each heater or according to each heater even at the same period. For example, the on time N11 for the first period of the upper heater 61 and the on time N21 for the first period of the lower heater 62 may be differently set.

As described above, even when the on/off times are set according to each heater, the control unit 200 sets the on/off times for each period through comparison among the target temperature A, a current temperature, and a previous temperature. Hereinafter, a method of setting the on/off times for each period through comparison among the target temperature A, a current temperature, and a previous temperature will be described in detail. For convenience of explanation, a case in which on/off times of all the heaters are set to the same value instead of setting on/off times according to each heater will be described below.

The control unit 200 extracts the on/off times of the heater module 60 that are preset according to the target temperature A and stored in the storage unit 400 from the storage unit 400. For example, the on/off times for a temperature difference x are respectively preset at Nx and Fx and stored in the storage unit 400 and, when the input target temperature A exceeds a temperature at the preheating completion time by x, the control unit 200 extracts the on time Nx and the off time Fx from the storage unit 400.

The control unit 200 compares the target temperature A and a current temperature at the beginning of each period and first determines whether the on/off times increase or decrease according to whether the current temperature is higher or lower than the target temperature. This may be simply referred to as "proportional control," and the on/off times that increase or decrease by the proportional control may be defined as ±Z1j where j represents a period.

In addition, the control unit 200 compares a current temperature and a previous temperature at the beginning of each period. When the current temperature and the previous temperature are identical, i.e., when the temperature is stable, the control unit 200 secondly determines whether the on/off times increase or decrease according to whether the current temperature is greater or less than the target temperature A. This may be referred to as "integral control," and the on/off times that increase or decrease by the integral control may be defined as ±Z2j where j represents a period.

When the current temperature and the previous temperature are different, the control unit 200 secondly determines whether the on/off times increase or decrease according to whether the current temperature is greater or less than the previous temperature. This may be referred to as "differential control," and the on/off times that increase or decrease by the differential control may be defined as ±Z3j where j represents a period. The proportional control, integral control and differential control of the control unit 200 will be described below in further detail with reference to FIGS. 7A to 9.

Figure 7A:
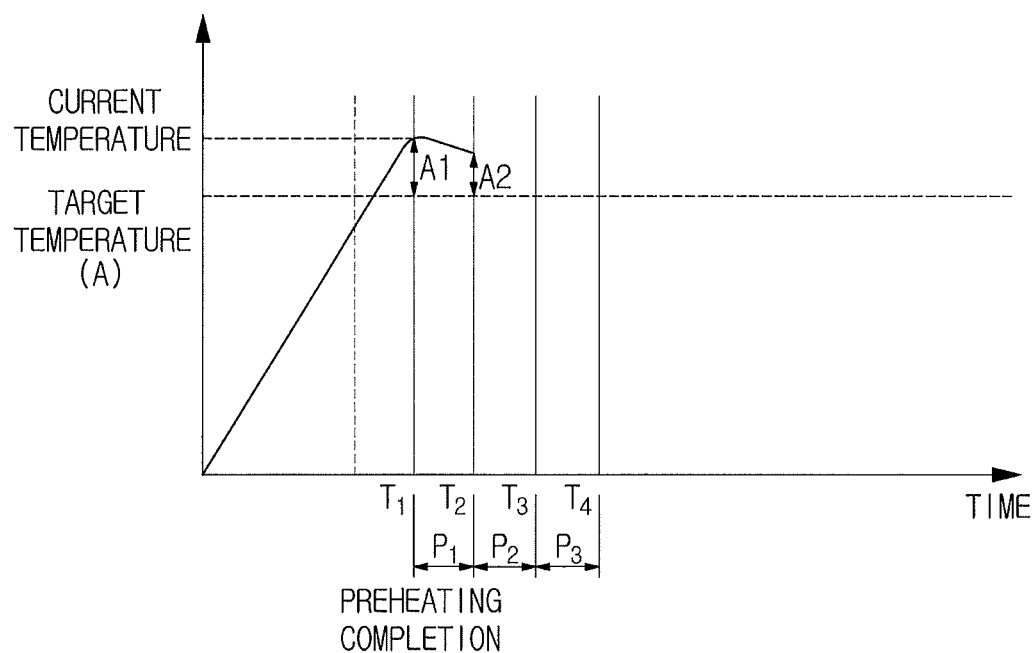
FIGS. 7A and 7B are diagrams for explaining proportional control.
Figure 7B:
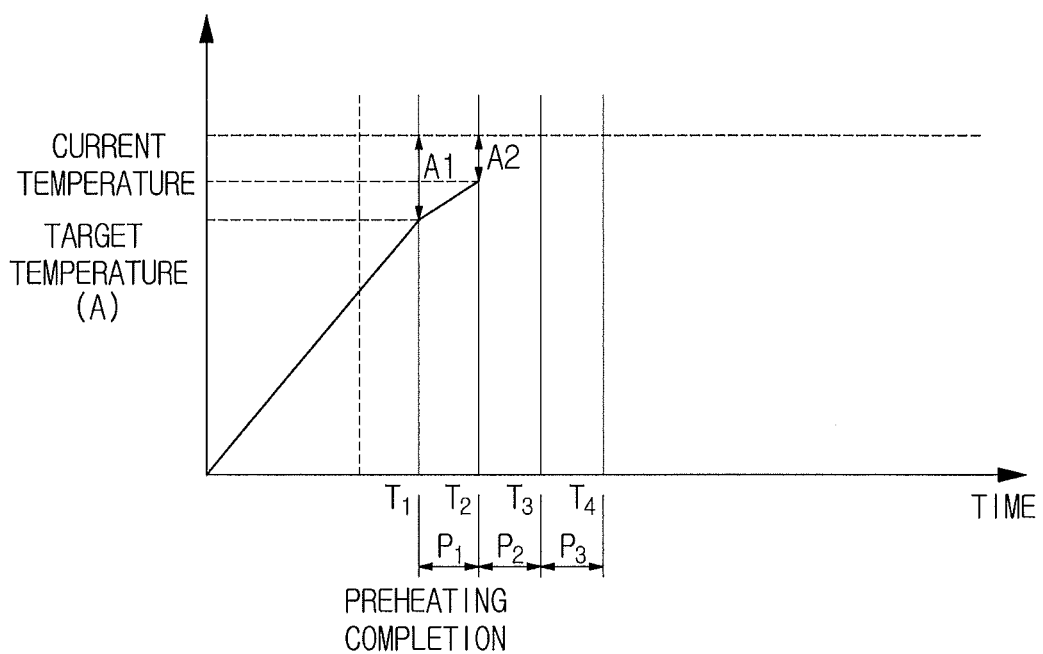

FIGS. 7A and 7B are graphs for explaining the proportional control.

As described above, the control unit 200 compares the target temperature A and a current temperature at the beginning of each period and performs "proportional control" in which it is determined whether on/off times increase or decrease according to whether the current temperature is greater or less than the target temperature A.

In particular, at the beginning of a first period P1, i.e., the preheating completion time T1, the control unit 200 determines whether the target temperature A and a current temperature (i.e., a temperature at T1) are identical or the current temperature exceeds the target temperature A. As illustrated in FIG. 7A, when the current temperature exceeds the target temperature A by A1, the control unit 200 controls the on time of the heater module 60 to be reduced by time Z11 corresponding to A1. On the other hand, as illustrated in FIG. 7B, when the current temperature is less than the target temperature A by A1, the control unit 200 controls the on time of the heater module 60 to be increased by time Z11 corresponding to A1.

In other words, the control unit 200 decreases the on time of the heater module 60 when the current temperature exceeds the target temperature A and increases the on time of the heater module 60 when the current temperature does not reach the target temperature A, so that the current temperature approximates to the target temperature A.

Such proportional control is performed at the beginning of each period. Even at the beginning of a second period P2, i.e., T2, the control unit 200 compares the target temperature A and a current temperature (i.e., a temperature at T2) and performs control such that, as illustrated in FIG. 7A, when the current temperature exceeds the target temperature A by A2, the on time of the heater module 60 is reduced by time Z12 corresponding to A2. On the other hand, as illustrated in FIG. 7B, the control unit 200 performs control such that, when the current temperature is less than the target temperature A by A2, the on time of the heater module 60 is increased by time Z12 corresponding to A2.

Figure 8A:
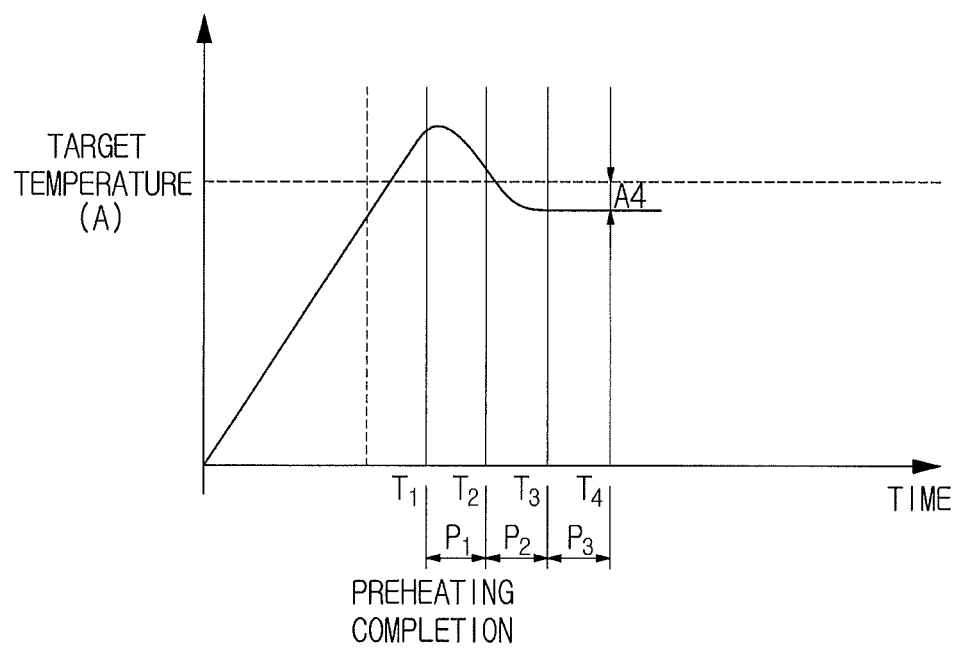
FIGS. 8A and 8B are diagrams for explaining integral control.
Figure 8B:
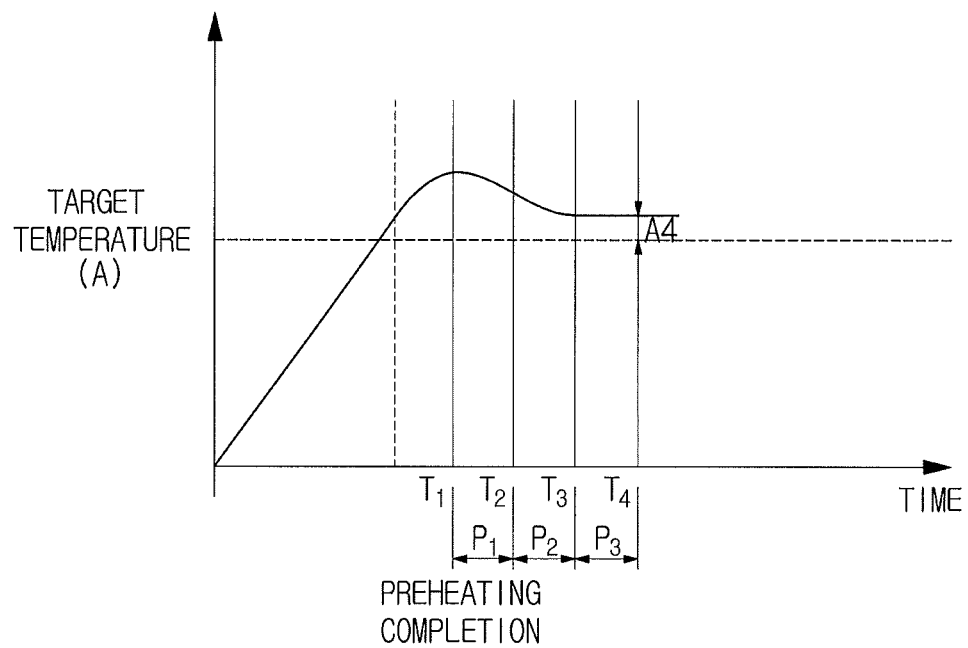

FIGS. 8A and 8B are graphs for explaining integral control.

The control unit 200 compares a current temperature and a previous temperature at the beginning of each period and, when the current temperature and the previous temperature are identical, the control unit 200 secondly performs "integral control" in which it is determined whether on/off times of the heater module 60 increase or decrease according to whether the current temperature is greater or less than the target temperature A. As described above, a state in which a current temperature and a previous temperature are identical may be referred to as a stable state.

For example, at a time T4 of a fourth period, the control unit 200 determines whether a current temperature (i.e., a temperature at T4) and a previous temperature (i.e., a temperature at T3) are identical. When the current temperature and the previous temperature are identical, the control unit 200 determines whether the current temperature exceeds the target temperature A.

As illustrated in FIG. 8A, when the current temperature and the previous temperature are identical and the current temperature is less than the target temperature A by A4, the control unit 200 controls the on time of the heater module 60 to be increased by time Z24 corresponding to A4. That is, upon reaching a stable state at a point at which a temperature at T4 of the cooking compartment 20 is less than the target temperature A, the control unit 200 increases the temperature of the stable state to be converged to the target temperature A by increasing the on time of the heater module 60.

As illustrated in FIG. 8B, when the current temperature and the previous temperature are the same and the current temperature exceeds the target temperature A by A4, the control unit 200 controls the on time of the heater module 60 to be decreased by time Z24 corresponding to A4. That is, upon reaching a stable state at a point at which the temperature at T4 of the cooking compartment 20 exceeds the target temperature A, the control unit 200 decreases the temperature of the stable state to be converged to the target temperature A by decreasing the on time of the heater module 60.

Figure 9:
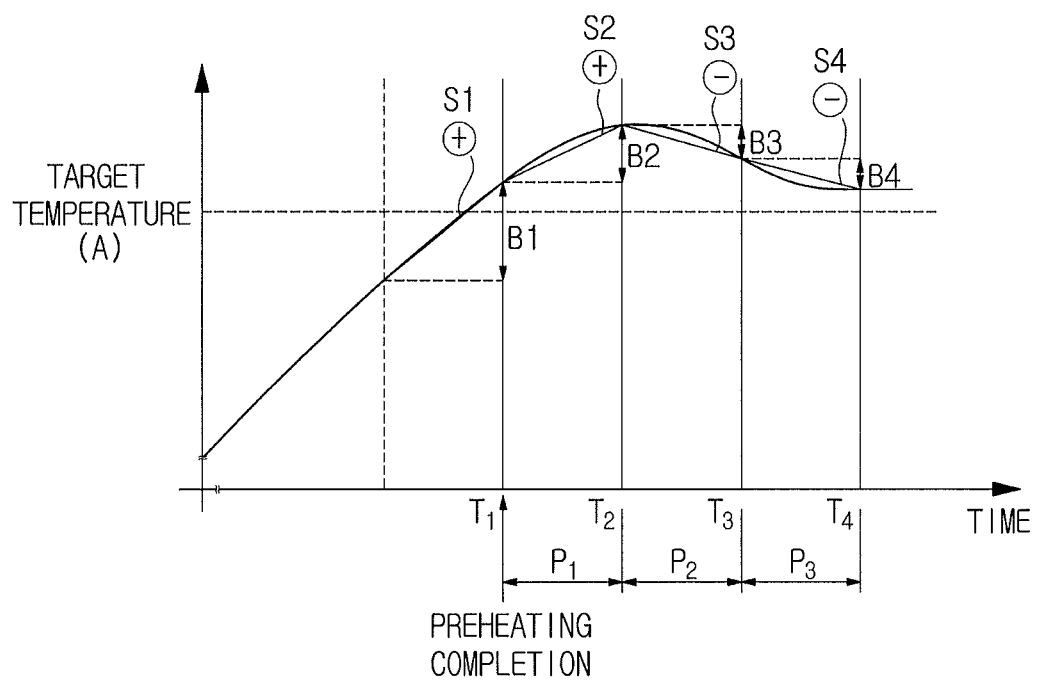
FIG. 9 is a diagram for explaining differential control.

FIG. 9 is a graph for explaining differential control.

In a case in which a current temperature and a previous temperature are different when comparing the current temperature and the previous temperature at the beginning of each period, i.e., when not reaching a stable state, the control unit 200 secondly performs "differential control" in which it is determined whether on/off times increase or decrease according to whether the current temperature is greater or less than the previous temperature.

As illustrated in FIG. 9, when not in a stable state at time T2 of the second period P2, the control unit 200 determines whether a current temperature (i.e., a temperature at T2) exceeds a previous temperature (i.e., a temperature at T1). When the current temperature exceeds the previous temperature by B2, the control unit 200 controls the on time of the heater module 60 to be decreased by time Z32 corresponding to B2. In other words, when an average slope S2 at T2 has a positive (+) value, it may be regarded that the control unit 200 controls the on time of the heater module 60 to be decreased by time Z32 corresponding to S2.

Similarly, when not in a stable state at time T3 of the third period P3, the control unit 200 determines whether a current temperature (i.e., a temperature at T3) exceeds a previous temperature (i.e., a temperature at T2). When the current temperature is less than the previous temperature by B3, the control unit 200 controls the on time of the heater module 60 to be increased by time Z33¬. corresponding to B3. In other words, when an average slope S3 at T3 has a negative (−) value, it may be regarded that the control unit 200 controls the on time of the heater module 60 to be increased by time Z33 corresponding to S3.

The control unit 200 performs control such that the average slope is in a horizontal state, i.e., a stable state by decreasing the on time of the heater module 60 when the average slope has a positive (+) value and increasing the on time of the heater module 60 when the average slope has a negative (−) value.

The integral control or differential control as described above is performed at the beginning of each period similar to the proportional control. Thus, at the beginning of each period, the control unit 200 first performs proportional control such that a current temperature approximates to the target temperature A through comparison between the current temperature and the target temperature A and secondly performs integral control such that a temperature of a stable state is converged to the target temperature A or performs differential control such that a non-stable state is converted to a stable state, through comparison between the current temperature and a previous temperature.

The control unit 200 resets on/off times of each period by accumulating on/off times for the target temperature A extracted from the storage unit 400 and times calculated for proportional control, integral control or differential control.

For example, assuming that the on/off times extracted for the target temperature A are Nx and Fx, a proportional control time +Z11 for the first period P1 is first calculated and an integral control time +Z12 for the first period P1 is secondly calculated, and a proportional control time +Z21 for the second period P2 is first calculated and a differential control time -Z31 for the second period P2 is secondly calculated, the control unit 200 may reset the on/off times N1 and F1 of the first period P1 to Nx+Z11+Z21 and Fx-Z11-Z21, respectively and reset the on/off times N2 and F2 of the second period P2 to N1+Z21-Z31 and F1-Z21+Z31, respectively.

In this regard, the control unit 200 resets the on time N1 of the first period P1 to Nx+Z11+Z21 and may reset the off time F1 based on a difference between a total time of the first period P1 and the on time N1. That is, the control unit 200 may reset the off time F1 of the first period P1 to (total time of the first period P1)-N1. Similarly, the control unit 200 resets the on time N2 of the second period P2 to N1+Z21-Z31 and may reset the off time F2 of the second period P2 to (total time of the second period P2)-N2 using the reset on time.

The control unit 200 outputs a control signal to the heater driving unit 300 so that the heater module 60 is driven according to the set on/off times.

The heater driving unit 300 controls on or off operation of the heater module 60 such that the heater module 60 performs heating or stops heating according to the control signal of the control unit 200. For example, when the control unit 200 sets the on/off times for the first period P1 of the heater module 60 at N1 and F1, respectively, the heater driving unit 300 controls on/off operations of the heater module 60 according to the set on/off times such that the heater module 60 operates in an on state for an interval between T1 and N1 and, after N1, the heater module 60 operates in an off state for the off time F1. In addition, when the control unit 200 sets the on/off times for the second period P2 of the heater module 60 at N2 and F2, respectively, the heater driving unit 300 controls on/off operations of the heater module 60 such that the heater module 60 operates in an on state at time T2 for the on time N2 and thereafter operates in an off state for the off time F2.

Such control of the on/off operations of the heater driving unit 300 continues until cooking is completed. In addition, the control unit 200 may also control a period at which the on/off states of the heater module 60 are repeated. The control unit 200 may also control an interval or frequency at which the on/off states of the heater module 60 are repeated. In this regard, the period at which the on/off states of the heater module 60 are repeated may be simply referred to as an on/off period of the heater module 60.

Referring back to FIG. 5, in an embodiment, the control unit 200 may set an interval between T1 and T2, which is a first period, an interval between T2 and T3, which is a second period, and an interval between T3 and T4, which is a third period, to 1 minute and output a control signal to the heater driving unit 300 according to the set interval. In another embodiment, the control unit 200 may set an interval of each of the first period, the second period, and the third period to 0.5 minutes and output a control signal to the heater driving unit 200 according to the set interval. As described above, the control unit 200 controls the on/off period of the heater module 60 to be short and thus resolution may be increased and precise control of the control unit 200 is possible.

The storage unit 400 may store data or algorithms for manipulation of the oven 1. For example, the storage unit 400 may store a sensing period of the temperature sensor 100, a preheating completion time, the target temperature A, and on/off times of the heater module 60 that are preset according to temperature differences. As another example of storage of data, the storage unit 400 may store on/off increase or decrease times of each period that are calculated by proportional control, integral control, or differential control and final on/off times of each period that are set by accumulating the on/off increase or decrease times.

As an example of storage of algorithms, the storage unit 400 may store an algorithm for calculating on/off increase or decrease times of each period through proportional control, integral control, or differential control and an algorithm for setting final on/off times of each period by accumulating the on/off increase or decrease times.

The storage unit 400 may be a non-volatile memory device such as a read-only memory (ROM), a programmable read-only memory (PROM), an erasable programmable read-only memory (EPROM), or a flash memory, a volatile memory device such as a random access memory (RAM), or a storage device such as a hard disk or an optical disk. However, embodiments of the present disclosure are not limited to the above examples and any other types of storage devices known in the art may be used.

FIG. 10 illustrates an internal temperature with respect to a target temperature of the cooking compartment 20.

As illustrated in FIG. 10, the target temperature is set to A1 at the beginning, to A2 after time Tx, and to A3 after time Ty.

The internal temperature of the cooking compartment 20 remains almost the same as the target temperature A1 after preheating is completed and, after increasing to the target temperature A2, rapidly increases and remains almost the same as the target temperature A2. Similarly, it can be confirmed that, when the target temperature is further increased to A3, the internal temperature of the cooking compartment 20 sharply increases and remains almost the same as the target temperature A3.

As can be confirmed by FIG. 10, the oven 1 significantly reduces a temperature ripple phenomenon by resetting on/off times of the heater module 60 according to each period through proportional control, integral control, or differential control. In addition, in the oven 1, the on/off period of the heater module 60 is set short during proportional control, integral control, or differential control, which enables precise control of the oven 1.

Hereinbefore, elements of the oven 1 and functions thereof have been described based on embodiments of the present disclosure. Hereinafter, a method of controlling the oven will be described with reference to the given flowchart.

Figure 11A:
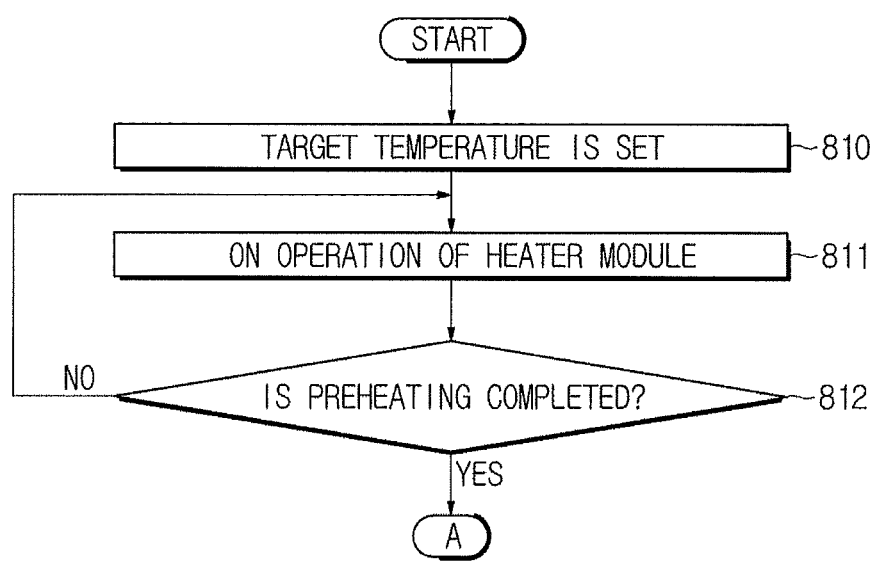
FIGS. 11A and 11B are flowcharts illustrating an oven control method according to an embodiment of the present disclosure.
Figure 11B:
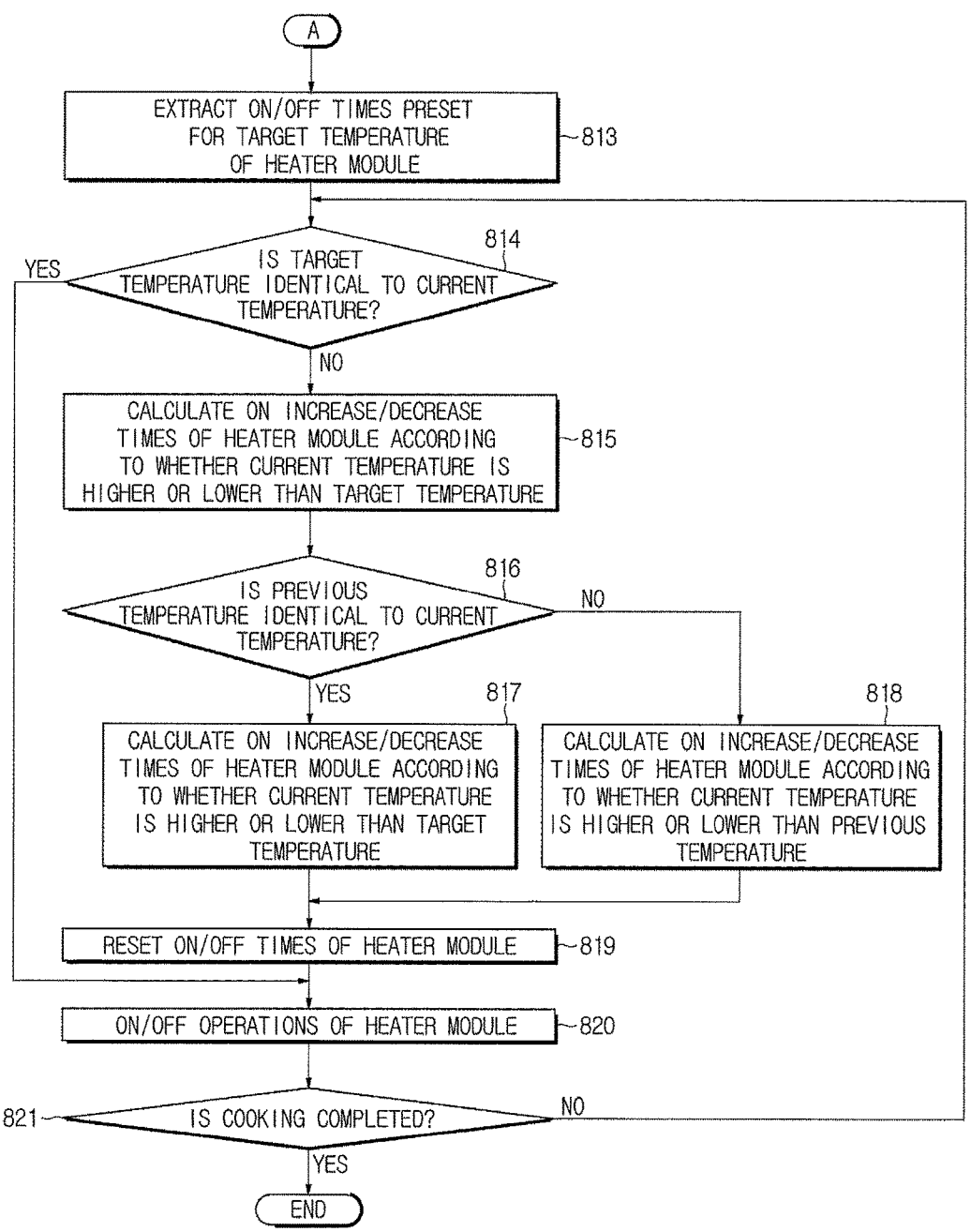

FIGS. 11A and 11B are flowcharts illustrating an oven control method according to an embodiment of the present disclosure.

Referring to FIGS. 11A and 11B, the target temperature A is set based on information input by a user (operation 810). After the target temperature A is set, the control unit 200 performs an on operation for preheating of the heater module 60 (operation 811).

The control unit 200 periodically determines whether preheating is completed (operation 812).

A preheating completion time or a preheating temperature is pre-set and stored in the storage unit 400, and the control unit 200 determines whether a preheating time reaches the stored preheating completion time or a current temperature of the cooking compartment 20 reaches the stored preheating temperature and determines whether preheating is completed.

When preheating is not completed, the control unit 200 continuously performs the on operation of the heater module 60.

When preheating is completed, the control unit 200 extracts on/off times of the heater module 60 that are preset for the target temperature A from the storage unit 400 (operation 813).

In other words, the on/off times of the heater module 60 are preset according to temperature differences and stored in the storage unit 400, and the control unit 200 extracts, from the storage unit 400, on/off times corresponding to a difference between the set target temperature A and a temperature at the preheating completion time.

The control unit 200 resets the on/off times for each period of the heater module 60 and controls the heater module 60 to operate according to the on/off times.

In particular, first, the control unit 200 determines whether the target temperature A is identical to a current temperature (operation 814). In this regard, the current temperature means an initial temperature of the corresponding period.

When the target temperature A and the current temperature are identical, the control unit 200 controls the heater module 60 to operate at the same on/off times as those extracted from the storage unit 400 or those of the previous period without resetting the on/off times for the corresponding period (operation 820).

When the target temperature A and the current temperature are different, the control unit 200 calculates on increase/decrease times of the heater module 60 according to whether the current temperature is greater or less than the target temperature A (operation 815). That is, on increase/decrease times for "proportional control" performed such that the current temperature approximates to the target temperature A are first calculated through comparison between the target temperature A and the current temperature.

Next, the control unit 200 determines whether the current temperature and a previous temperature are identical (operation 816). In this regard, the previous temperature means an initial temperature of the previous period.

When the current temperature and the previous temperature are identical, the control unit 200 calculates on increase/decrease times of the heater module 60 according to whether the current temperature is greater or less than the target temperature A (operation 817). That is, on increase/decrease times for "integral control" performed such that a temperature of a stable state is converged to the target temperature A are secondly calculated through comparison between the current temperature and the previous temperature.

When the current temperature and the previous temperature are different, the control unit 200 calculates on increase/decrease times of the heater module 60 according to whether the current temperature is greater or less than the previous temperature (operation 818). That is, on increase/decrease times for "differential control" performed such that an unstable state is converted to a stable state are calculated.

The control unit 200 resets the on/off times of the heater module 60 by accumulating the on/off times for the target temperature A extracted from the storage unit 400 and the on increase/decrease times calculated for proportional control, integral control, or differential control (operation 819).

For example, assuming that the extracted on/off times for the target temperature A are Nx and Fx, respectively, a proportional control time +Z11 for the first period is first obtained and an integral control time +Z12 for the first period P1 is secondly obtained, and a proportional control time +Z21 for the second period is first obtained and a differential control time −Z31 for the second period is secondly obtained, the control unit 200 may reset the on/off times N1 and F1 of the first period to Nx+Z11+Z21 and F1=Fx−Z11−Z21, respectively and reset the on/off times N2 and F2 of the second period to N1+Z21−Z31 and F1−Z21+Z31, respectively.

In this regard, the control unit 200 may reset the on time N1 of the first period to Nx+Z11+Z21 and reset the off time F1 based on a difference between a total time of the first period and the on time N1. That is, the off time F1 of the first period may be reset to (total time of the first period)−N1. Similarly, the control unit 200 may reset the on time N2 of the second period to N1+Z21−Z31 and reset the off time F2 of the second period to (total time of the second period)-N2 using the reset on time N2.

Next, the control unit 200 controls the heater module 60 to operate according to the set on/off times for the corresponding period (operation 820).

At a time at which the corresponding period is completed, the control unit 200 determines whether cooking is completed (operation 821). When cooking is completed, the heater module 60 is stopped. On the other hand, when cooking is incomplete, operation returns to operation 814 to start the next period and then it is determined whether the target temperature A and the current temperature are identical.

As such, the control unit 200 resets the on/off times of the heater module 60 according to each period through proportional control, integral control, or differential control, whereby the temperature ripple phenomenon occurring in the oven 1 may be significantly reduced. In addition, the control unit 200 sets the on/off period of the heater module 60 short during proportional control, integral control, or differential control, whereby precise control is possible.

The control unit or controller 200 according to the above-described example embodiments may use one or more processors. For example, a processing device may be implemented using one or more general-purpose or special-purpose computers, and may include, for example, one or more of a processor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor or any other device capable of responding to and executing instructions in a defined manner.

Although embodiments of an oven and a control method therefor have been described with reference to the accompanying drawings, it will be understood by those of ordinary skill in the art to which the present disclosure pertains that the disclosure may be embodied in other particular forms without modifying the technical teachings or essential features of the disclosure. Thus, it should be understood that the above-described embodiments are provided for illustrative purposes only and are not intended to limit the scope and spirit of the disclosure.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An oven comprising:
   a heater arranged in a cooking compartment;
   a temperature sensor to sense a temperature of the cooking compartment for a plurality of preset periods of time; and
   a controller configured to:
   calculate a plurality of increases or decreases of on/off times of the heater for at least one of the plurality of preset periods based on a preset target temperature, a current temperature sensed by the temperature sensor, and a previous temperature of the cooking compartment sensed by the temperature sensor, the plurality of increases or decreases of on/off times of the heater including
      a first increase or decrease of the on/off times of the heater based on proportional control and a comparison between the preset target temperature and the current temperature,
      a second increase or decrease of the on/off times of the heater based on integral control and a comparison between the previous temperature and the current temperature, and
      a third increase or decrease of the on/off times of the heater based on differential control and the comparison between the previous temperature and the current temperature;
   reset the on/off times of the heater by accumulating the calculated plurality of increases or decreases of the on/off times of the heater to the on/off times; and
   control a driving of the heater according to the reset on/off times.

2. The oven according to claim 1, wherein the controller is further configured to control the driving of the heater such that the heater is turned on until prior to a preheating completion time and resets the on/off times for a preset period of the plurality of preset periods after the preheating completion time of the heater.

3. The oven according to claim 1, wherein the current temperature is a temperature of the cooking compartment at a time at which a current preset period of the plurality of preset periods starts.

4. The oven according to claim 1, wherein the previous temperature is a temperature of the cooking compartment at a time at which a preset period previous to a current preset period of the plurality of preset periods starts.

5. The oven according to claim 1, further comprising a memory to store the on/off times of the heater preset according to temperature differences.

6. The oven according to claim 5, wherein the controller is further configured to extract the on/off times of the heater stored in the memory, based on a difference between the preset target temperature and a temperature of the cooking compartment at a preheating completion time.

7. The oven according to claim 1, wherein, based on the proportional control, the controller is further configured to calculate the first increase or decrease of the on/off times so that, for a period at which the current temperature exceeds the preset target temperature, the on time of the heater decreases and the off time of the heater increases.

8. The oven according to claim 1, wherein, based on the proportional control, the controller is further configured to calculate the first increase or decrease of the on/off times so that, for a period at which the current temperature is lower than the preset target temperature, the on time of the heater increases and the off time of the heater decreases.

9. The oven according to claim 1, wherein, based on the integral control, the controller is further configured to calculate the second increase or decrease of the on/off times for a period of time at which the current temperature and the previous temperature are identical, through the comparison between the preset target temperature and the current temperature.

10. The oven according to claim 1, wherein, based on the differential control, the controller is further configured to calculate the third increase or decrease of the on/off times so that, for a period of time at which the current temperature exceeds the previous temperature, the on time of the heater decreases and the off time of the heater increases.

11. The oven according to claim 1, wherein, based on the differential control, the controller is further configured to calculate the third increase or decrease of on/off times so that, for a period of time at which the current temperature is lower than the previous temperature, the on time of the heater increases and the off time of the heater decreases.

12. The oven according to claim 1, wherein the controller is further configured to adjust an interval or frequency of the at least one of the plurality of preset periods.

13. The oven according to claim 1, wherein the controller is further configured to:
   when the comparison between the preset target temperature and the current temperature indicates that the current temperature is not identical to the target temperature, and when the comparison between the previous temperature and the current temperature indicates that the current temperature is identical to the previous temperature,
      add the first increase or decrease of the on/off times and the second increase or decrease of the on/off times to the on/off times of the heater, to reset the on/off times of the heater; and
   when the comparison between the preset target temperature and the current temperature indicates that the current temperature is not identical to the target temperature, and when the comparison between the previous temperature and the current temperature indicates that the current temperature is not identical to the previous temperature,
      add the first increase or decrease of the on/off times and the third increase or decrease of the on/off times to the on/off times of the heater, to reset the on/off times of the heater.

14. An oven comprising:
   a heater installed inside a cooking compartment;
   a temperature sensor to sense a temperature of the cooking compartment; and
   a controller configured to, in accordance with a target temperature of the cooking compartment input to the oven:
   control the heater to be turned on until the temperature of the cooking compartment reaches a preheating temperature;
   calculate a plurality of increases or decreases of on/off operations of the heater based on the target temperature, a current temperature of the cooking compartment sensed by the temperature sensor and that is the temperature of the cooking compartment after the temperature of the cooking compartment reaches the preheating temperature, and a previous temperature of the cooking compartment sensed by the temperature sensor and that is the temperature of the cooking compartment after the temperature of the cooking compartment reaches the preheating temperature and before the current temperature, the plurality of increases or decreases of on/off times of the heater including a first increase or decrease of the on/off times of the heater based on proportional control and a comparison between the preset target temperature and the current temperature, a second increase or decrease of the on/off times of the heater based on integral control and a comparison between the previous temperature and the current temperature, and a third increase or decrease of the on/off times of the heater based on differential control and the comparison between the previous temperature and the current temperature;

reset the on/off operations of the heater by accumulating the calculated plurality of increases or decreases of the on/off operations of the heater to the on/off operations; and control the on/off operations of the heater based on the reset on/off operations.

15. The oven according to claim 14, wherein the controller is further configured to control the on/off operations of the heater so that the temperature of the cooking compartment converges to the target temperature.

16. The oven according to claim 14, wherein the controller is further configured to periodically set on/off times of the heater and controls driving of the heater according to the set on/off times.

* * * * *